Figure 1:
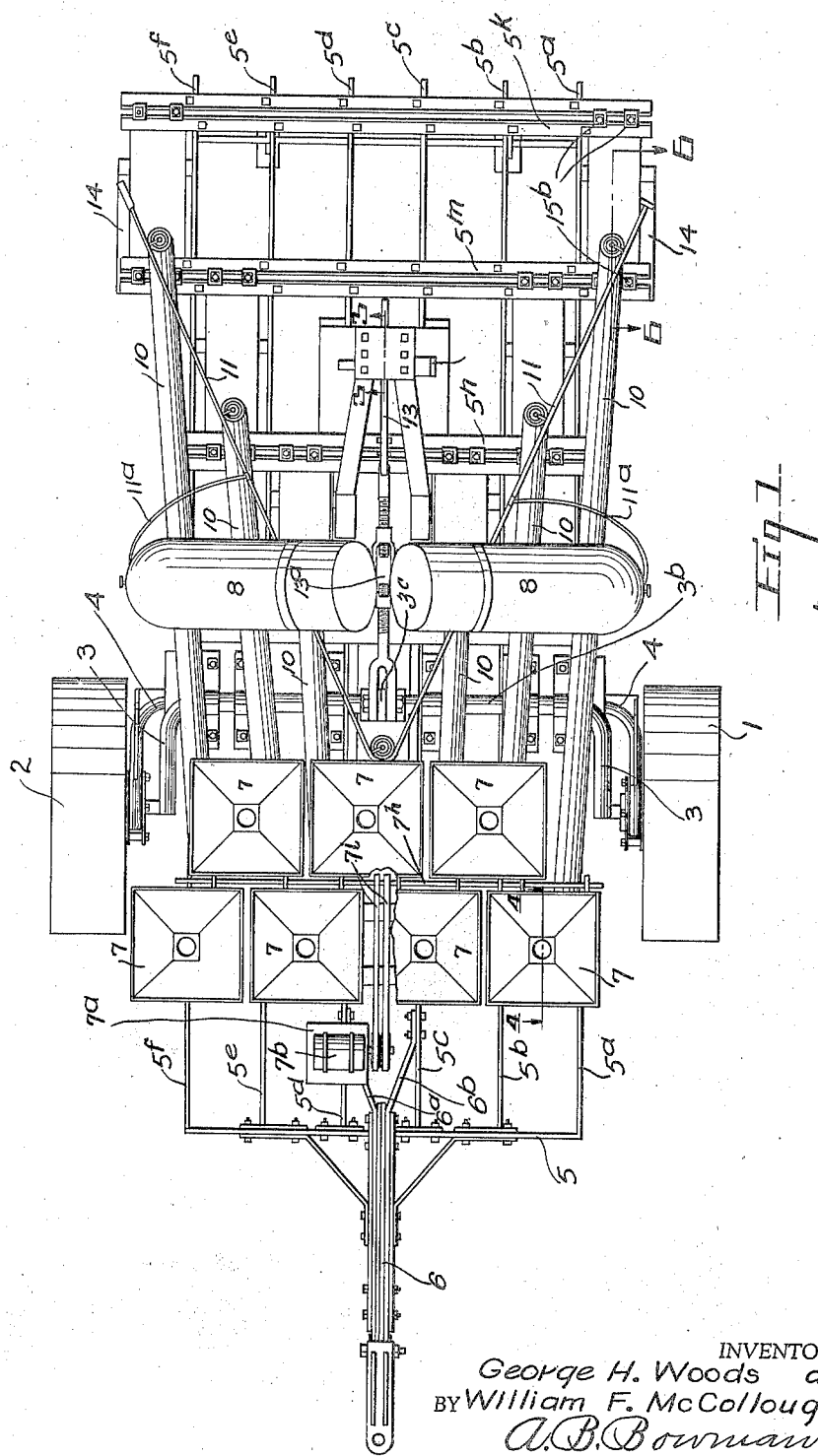

April 8, 1941.  G. H. WOODS ET AL  2,237,775
COMBINATION PLOW, FERTILIZER, AND FUMIGATING APPARATUS
Filed June 15, 1938   3 Sheets-Sheet 1

INVENTORS
George H. Woods and
BY William F. McCollough
A. B. Bowman
ATTORNEY.

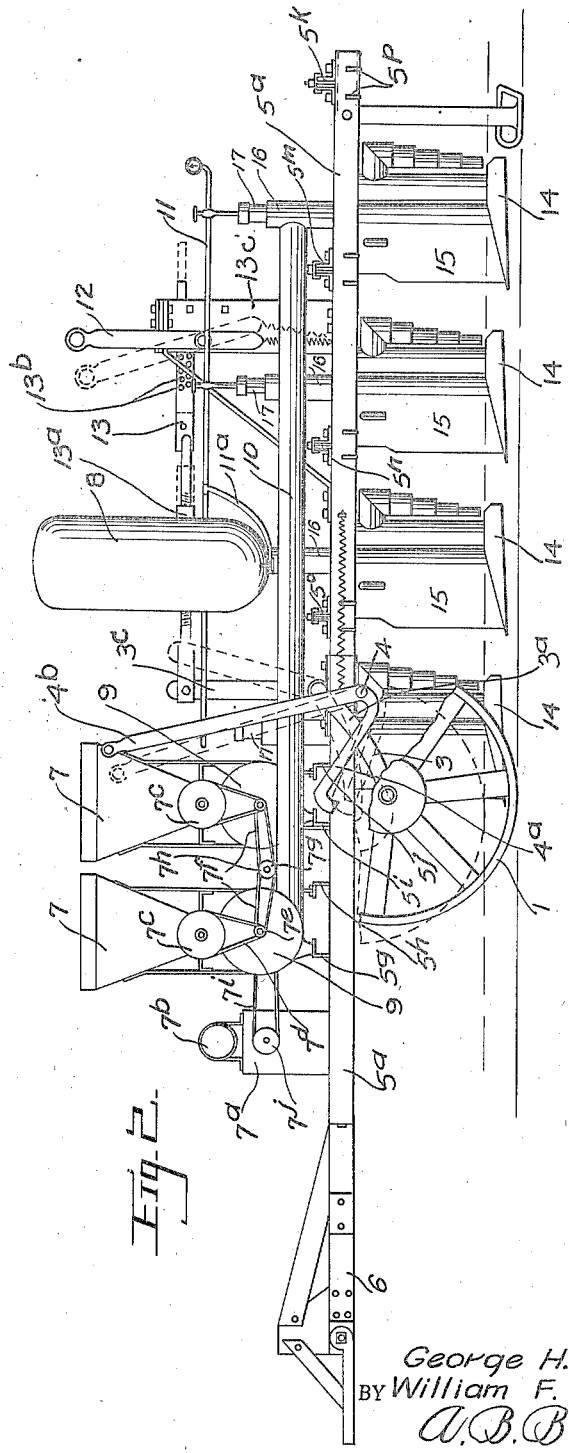

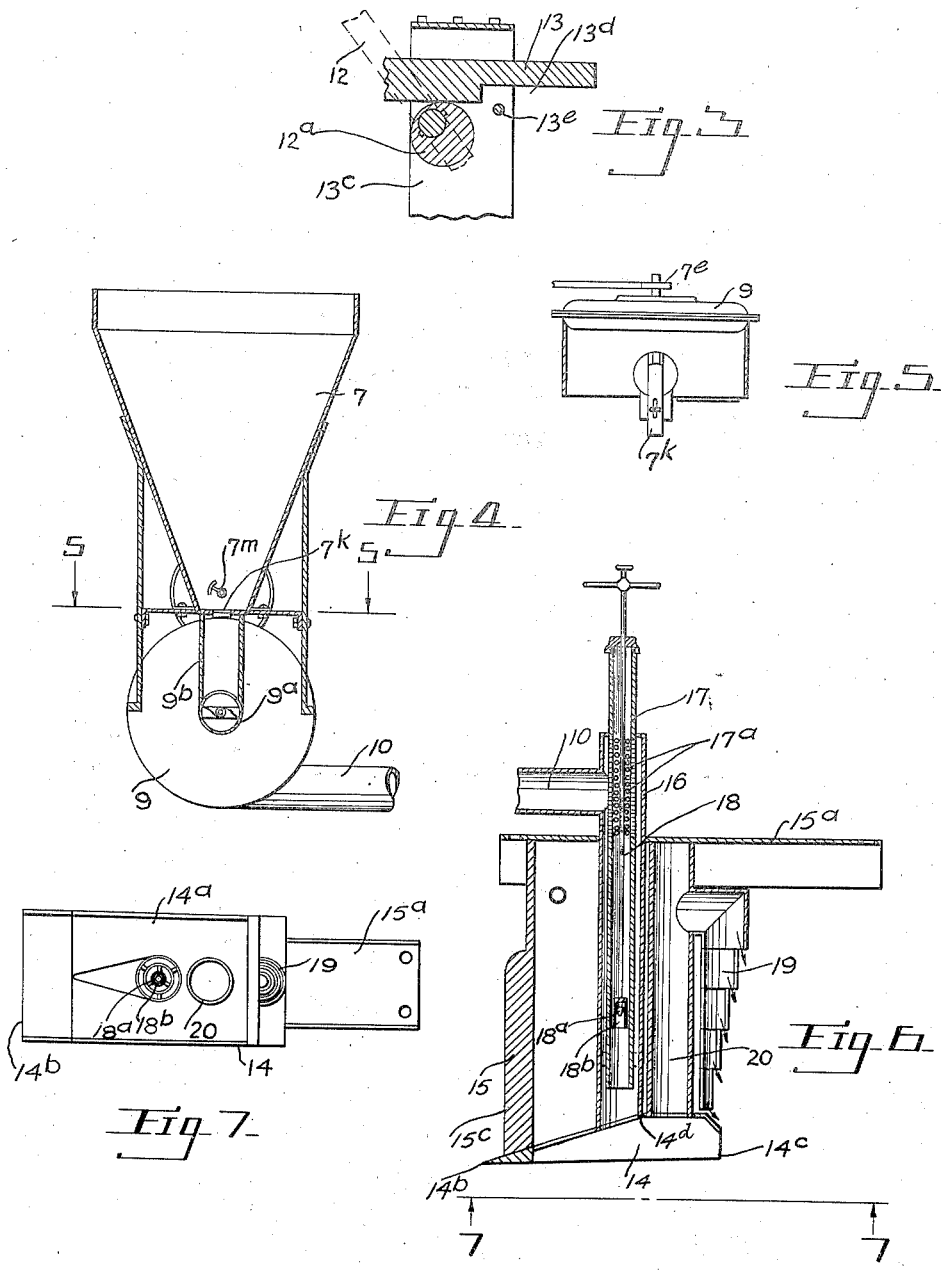

Patented Apr. 8, 1941

2,237,775

UNITED STATES PATENT OFFICE 2,237,775

COMBINATION PLOW, FERTILIZER, AND FUMIGATING APPARATUS

George H. Woods, San Diego, and William F. McCollough, Calexico, Calif.

Application June 15, 1938, Serial No. 213,826

14 Claims. (Cl. 111—7)

Our invention relates to a combination plow, fertilizer and fumigating apparatus and the objects of our invention are:

First, to provide an apparatus of this class which will simultaneously plow and cultivate the ground, fertilize the same and fumigate it;

Second, to provide an apparatus of this class which will plow and cultivate the soil surface at various depths and at the same time heat all of said soil so as to destroy detrimental bugs, worms or the like as well as kill deleterious weeds, roots and plant life and at the same time feed the soil with certain food properties for neutralizing the same;

Third, to provide an apparatus of this class in which every part and portion of the top surface of the soil covered by the apparatus will be contacted, moved and broken up;

Fourth, to provide an apparatus of this class which may be used for neutralizing the soil and change it where it has an excess of alkali or acid condition;

Fifth, to provide an apparatus of this class in which the soil is plowed or cultivated and fertilizer introduced to great depth and thus intermingling the fertilizer with the soil to great depth from the surface;

Sixth, to provide an apparatus of this class by the use of which fungus, plant parasites, soil pests and their eggs and larva in the soil are completely destroyed;

Seventh, to provide an apparatus of this class in which the soil may be fully and completely fertilized satisfactorily for the purpose the soil is to be used for to supplement elements known to be deficient;

Eighth, to provide an apparatus of this class by the use of which obnoxious grasses such as Johnson, Bermuda grass etc., weeds and seeds in the soil are destroyed and the soil made new and fully renovated;

Ninth, to provide an apparatus of this class in which certain fertilizer elements may be produced by combinations of ingredients with the heat for fumigating purposes;

Tenth, to provide an apparatus of this class in which the soil surface down to eighteen inches or more from the upper surface may be completely impregnated with intense heat, fertilizer and neutralizing chemicals and gases;

Eleventh, to provide an apparatus of this class in which the fertilizer may be distributed in such heated form that it forms a gas and therefore penetrates further and is quicker acting;

Twelfth, to provide an apparatus of this class which is very simple and economical of construction, easy to operate, and efficient in its action in accordance with its functions.

With these and other objects in view as will appear hereinafter our invention consists of certain novel features of construction, combination and arrangement of parts and portions as will be hereinafter described in detail and particularly set forth in the appended claims reference being had to the accompanying drawings and to the characters of reference thereon which form a part of this application in which:

Figure 1 is a top or plan view of our combination plow, fertilizer and fumigating apparatus complete; Fig. 2 is a side elevational view thereof showing some of the parts broken away to facilitate the illustration and showing by dash lines varying positions of some of the operating parts and portions; Fig. 3 is a sectional view on an enlarged scale taken from the line 3—3 of Fig. 1; Fig. 4 is an enlarged fragmentary sectional view taken from the line 4—4 of Fig. 1 and showing some of the parts and portions in elevation to facilitate the illustration; Fig. 5 is a sectional view taken from the line 5—5 of Fig. 4; Fig. 6 is an enlarged sectional view taken from the line 6—6 of Fig. 1 and Fig. 7 a bottom view taken from the line 7—7 of Fig. 6.

Similar characters of reference refer to similar parts and portions throughout the several views of the drawings:

The wheels 1 and 2, main axle 3, depth control shaft 4, main frame 5, tongue 6, hoppers 7, fuel supply tanks 8, blower fans 9, product conductors 10, fuel conductors 11, axle regulating lever 12, connecting bar 13, plow members 14, cutter members 15, conductors 16, tubes 17, fuel conductors 18, exhaust 19 and exhaust conductors 20 constitute the principal parts and portions of our combination plow, fertilizer and fumigating apparatus.

The wheels 1 and 2 are of conventional type except that they are especially broad and large at their rim surface to provide wheels that will carry considerable load over relatively soft ground if necessary. The wheels 1 and 2 are mounted on a main axle 3 which is an offset eccentric axle which curves upwardly and backwardly at the portion 3a as shown best in Fig. 2 of the drawings and is connected by a straight extended portion so that the wheels are spaced a suitable distance apart from 5 or 6 feet dependent upon the number of plow units utilized. The straight portion 3b of this axle is journalled on the frame member 5 on the top of the longitudinal bars 5a to 5f inclusive, and secured to this portion 3b of the main axle 3 is an upwardly extending arm member 3c which is for the purpose of rocking the axle 3 and therefore shifting the wheels 1 and 2 relatively to the frame 5 as shown by solid and dash lines of the wheel in Fig. 2 of the drawings.

Secured to the front end of the frame consisting of the frame members 5a to 5f inclusive is a tongue member 6 which is made up of a plurality of bars forming a laminated tongue member which extends forwardly from the frame 5 and is adapted as a hitch for securing the same to a tractor or other means of propulsion. This tongue member 6 is provided with backwardly extending brace members 6a and 6b which extend backwardly and connect with the frame members 5d and 5c respectively and supported on the members 5d and 6a just backwardly of the tongue member 6 is a motor 7a on which is mounted the fuel tank 7b shown best in Figs. 1 and 2 of the drawings.

Mounted on the frame members 5a to 5f inclusive just backwardly of the motor 7a are cross angle members 5g to 5j which form supports for two rows of blowers 9 and hoppers 7, there being four positioned in the first row and three in the second row conforming with the number of plows 14 as will be hereinafter described. These blowers 9 are of conventional blower fan type and each is provided with an outlet conductor which we have designated product conductor 10 which extends backwardly and connects with the plow member 14 as will be hereinafter described. Each of the fan members is provided with an inlet portion 9a, shown best in Fig. 4 of the drawings, which connects with a downwardly directed spout 9b from the hopper 7, the hopper 7 being provided with a regulating slide member 7k shown best in Figs. 4 and 5 of the drawings, which is adapted to be shifted longitudinally to regulate the flow of the contents from the hopper 7 into the blower 9, the contents being agitated by means of an agitator 7m positioned just above the slide 7k in the hopper 7. The shafts of the agitators 7m are operated by means of pulleys 7c, shown best in Fig. 2 of the drawings, which are operated by belts 7d mounted over pulleys 7e which are mounted on the shafts of the blowers 9. These shafts of the agitators 7m are operated by means of the belts 7d connected with pulleys 7e which are operated by belts 7f on the pulleys 7g which are mounted on an intermediate shaft 7h. This intermediate shaft 7h is operated by belts 7i. The belts 7i are mounted on pulleys 7j secured on the shaft of the motor 7a. These hoppers 7 are filled with fertilizer or various chemicals which are to be distributed into the soil and are forced under pressure from the blowers 9 through the conductors 10. The hopper 7 is suitably braced relatively to the blower 9 to provide ample support for the hopper.

Journalled on the lower side of the frame members 5a to 5f inclusive substantially directly below the shaft portion 3b is a depth control shaft 4 which is provided with two forwardly and upwardly extending arm members 4a which are adapted to engage the upper surface of the wheel hub over the end of the axle 3a raising the frame relatively to the wheel which is accomplished by means of a lever 4b which extends upwardly some distance as shown by solid and dash lines in Fig. 2 of the drawings and is adapted to be connected with the hitch mechanism or motor for shifting the lever 4b forwardly lowering the arm members 4a into engagement with the upper surface of the wheel hubs and thus raising the frame 5 upwardly relatively to the wheels. In order to regulate the relative position of the frame with the wheels there is provided a connecting bar 13 which is pivotally connected with the upper end of the arm 3c and extends backwardly provided with an adjusting turn buckle 13a to regulate the length of said bar 13. This bar 13 is provided with a plurality of holes 13b which are adapted to receive a bolt or pin which rests against one side of the upright 13c for regulating the shift of the bar 13. This bar 13 is also provided in its extended end with a notch portion 13d, shown best in Fig. 3, in its lower side which is adapted to be engaged by a bolt or pin 13e when said member 13 is moved and the up and down position of this end of the member 13 is regulated by means of a cam member 12a secured to the axle regulating lever 12 which is pivotally mounted upon the upright 13c all as shown best in Fig. 3 of the drawings and adapted to raise and lower the end of the member 13 so that it engages or disengages the bolt member 13e in the upright 13c, the varying positions of the lever 12 being shown by solid and dash lines in Fig. 2 of the drawings.

It will be here noted that the bolt or pin in the various positioned holes 13b provides for the regulation of the position of the shaft 3b relative to the ground surface, thus regulating the depth of the plow when in operation.

Mounted intermediate the ends of the frame member 5 positioned above the conductor 10 are the fuel supply tanks 8, one on each side and positioned on an angle as shown best in Figs. 1 and 2 of the drawings. Communicating with said fuel tanks at their lower ends are branch fuel conductors 11a and communicating with these branches 11a is the fuel conductor 11 which is a V-shaped conductor shown best in Figs. 1 and 2 of the drawings and adapted to conduct fuel from the fuel tanks 8 to the various plow members 14 as will be hereinafter described.

Secured on the upper sides of the frame members 5a to 5f toward the rear side are cross members 5k, 5m, 5n and 5o, shown best in Figs. 1 and 2 of the drawings. Each of these cross members consists of two angle members which are secured to the bars 5a to 5f by means of hooked bolts 5p. Secured on these members 5k to 5o in triangularly arranged position are the seven plow members 14 which are supported in their staggered relation by means of bar members 15a, shown best in Figs. 6 and 7 of the drawings, which are channel members with the side members extending downwardly supported by bolts 15b as shown best in Fig. 1 of the drawings. Secured in each of these channel members 15a is a cutter member 15 which is a hollow member provided with a pointed end at 15c which is sharp and adapted to divide the soil, the front end being substantially V-shaped and enlarging backwardly as shown best in Fig. 7 of the drawings. Secured on the lower end of this cutter member 15 is the plow member 14. This plow member 14 is provided with a substantially rectangular shaped frame member 14a which is pointed at its front end at 14b and extends forwardly some distance in front of the front edge of the cutter member 15 and tapers upwardly and backwardly substantially one-half its length. It is positioned relatively to the cutter 15 so that the front pointed end 14b is considerably lower than the heel end 14c and still lower than the central portion 14d so that as it passes through the soil, soil is raised leaving a loose portion at the lower side.

Mounted intermediate the front and back sides of this member 14 and extending upwardly is a tubular conductor 16 which extends upwardly and communicates with the conductor 10 near its upper end. Thus the products from the hopper 7 pass downwardly through this tube 16 under pressure from the blowers and out into the hollow portion of the plow member 14. Positioned on the inside of this member 16 is another tubular member 17 which extends upwardly slightly above the upper end of the member 16. This tubular member 17 is provided with perforations 17a to permit some of the products coming through the conductor 10 to pass inwardly inside of said tube 17 and pass downwardly inside of said tube 17. This tube 17 does not extend to the shoe 14 but is spaced therefrom as shown best in Fig. 6 of the drawings. Positioned on the inside of the tube 17 is the fuel conductor 18 which extends downwardly and is provided some distance above the lower end of the tube 17 with a nozzle member 18a positioned in a burner 18b for burning the fuel passing from the tanks 8 through the conductors 11 and 18.

Communicating with the upper side of the shoe 14 and extending upwardly therefrom and connecting with the member 15a is an exhaust and heat conductor 20 and communicating near the upper end of this conductor 20 is the exhaust 19 which consists of a plurality of downwardly decreasing step members adapted to permit the exit of the exhaust outwardly as shown by arrows in Fig. 6 of the drawings. Thus it will be noted that products may be fed to the soil from the hoppers 7 through the conductor 10 by pressure from the blowers 9 passing through the tubes 16 and 17 contacting with the blaze and intense heat from the burner 18b and this heat and fertilizer is distributed into the soil surrounding the plow 14 and below the same and some of it is forced upwardly through the tube 20 and out through the exhaust 19 as shown by arrows in Fig. 6 of the drawings causing the destruction of all plant and animal life in the soil penetrated by the plow 14 together with the cutter 15.

It will be noted that these plows may be lowered relatively to the wheels so that the soil may be broken up from 18 inches or more from its top surface if desired and the soil renovated, fumigated, fertilized or chemicals added for neutralizing purposes and the soil fully plowed, cultivated, and broken up over the entire surface.

Though we have shown and described a particular construction, combination and arrangement of parts and portions we do not wish to be limited to this particular construction, combination and arrangement, but desire to include in the scope of our invention the construction, combination and arrangement substantially as set forth in the appended claims.

Having thus described our invention, what we claim as new and desire to secure by Letters Patent is:

1. In a plow of the class described, a plurality of hollow tapered substantially rectangularly shaped members open over the whole area at their lower sides positioned in staggered relation to each other and arranged so that their paths overlap each other at their edges when in operation.

2. In a plow of the class described, a plurality of hollow tapered substantially rectangularly shaped members open over the whole area at their lower sides positioned in staggered relation to each other and arranged so that their paths overlap each other at their edges when in operation, and cutter members secured adjacent the front end of said plow members and extending upwardly at their center.

3. In a plow of the class described, a plurality of hollow tapered substantially rectangularly shaped members open over the whole area at their lower sides positioned in staggered relation to each other and arranged so that their paths overlap each other at their edges when in operation, cutter members secured adjacent the front end of said plow members and extending upwardly at their center, each of said plow members tilted so that their front ends are considerably lower than their heel or trailing end at their lower side.

4. In a plow of the class described, a plurality of hollow tapered substantially rectangularly shaped members positioned in staggered relation to each other and arranged so that their paths overlap each other at their edges when in operation, cutter members secured near the front end of said plow members and extending upwardly at their center, each of said plow members tilted so that their front ends are considerably lower than their heel or trailing end, burners in cooperative relation with the interior of said plows, and exhaust conductors communicating with the interior of said plow members and extending upwardly and provided with a plurality of downwardly directed exit portions.

5. In a plow of the class described, a plurality of hollow tapered substantially rectangularly shaped members positioned in staggered relation to each other and arranged so that their paths overlap each other at their edges when in operation, cutter members secured near the front end of said plow members and extending upwardly at their center, each of said plow members tilted so that their front ends are considerably lower than their heel or trailing end, burners in cooperative relation with the interior of said plows, exhaust conductors communicating with the interior of said plow members and extending upwardly and provided with a plurality of downwardly directed exit portions, and a tube communicating with each of said plow members and means for forcing products through said tube toward said plow members.

6. In a plow of the class described, a plurality of hollow tapered substantially rectangularly shaped members positioned in staggered relation to each other and arranged so that their paths overlap each other at their edges when in operation, cutter members secured near the front end of said plow members and extending upwardly at their center, each of said plow members tilted so that their front ends are considerably lower than their heel or trailing end, burners in cooperative relation with the interior of said plows, exhaust conductors communicating with the interior of said plow members and extending upwardly and provided with a plurality of downwardly directed exit portions, a tube communicating with each of said plow members, means for forcing products through said tube toward said plow members, and wheels for supporting said plow in certain relation with the surface of the ground.

7. In a combination plow and fertilizer apparatus, a plurality of combined plow and cutter members arranged in V-shaped alignment and so that their paths of travel are in overlapped relation to each other, said plow members and cutters being hollow, means for conducting fertilizer under pressure to said plows through said cutter members.

8. In a combination plow and fertilizer apparatus, a plurality of combined plow and cutter members arranged in V-shaped alignment and so that their paths are in overlapped relation to each other, said plow members and cutters being hollow, means for conducting fertilizer under pressure to said plows through said cutter members, said plow members consisting of substantially rectangular shaped tapering hollow plate members open at their lower sides.

9. In a combination plow, fertilizer and fumigating apparatus, a plurality of combined plow and cutter members arranged in V-shaped alignment and so that their paths are in overlapped relation to each other, said plow members and cutters being hollow, means for conducting fertilizer under pressure to said plows through said cutter members, said plow members consisting of substantially rectangular shaped tapering hollow plate members open at their lower sides, burners in cooperative relation with the interior of said plows, and exhaust conductors communicating with the back upper portion of said plow members provided with downwardly directed exit portions at the back side of said plow member.

10. In a combination plow, fertilizer and fumigating apparatus, a plurality of combined plow and cutter members arranged in V-shaped alignment and so that their paths are in overlapped relation to each other, said plow members and cutters being hollow, means for conducting fertilizer under pressure to said plows through said cutter members, said plow members consisting of substantially rectangular shaped tapering hollow plate members open at their lower sides, burners in cooperative relation with the interior of said plows, exhaust conductors communicating with the back upper portion of said plow members provided with downwardly directed exit portions at the back side of said plow member, and means for conducting fertilizer to said plow members in regulated quantities.

11. In a combination plow, fertilizer and fumigating apparatus, a plurality of combined plow and cutter members arranged in V-shaped alignment and so that their paths are in overlapped relation to each other, said plow members and cutters being hollow, means for conducting fertilizer under pressure to said plows through said cutter members, said plow members consisting of substantially rectangular shaped tapering hollow plate members open at their lower sides, burners in cooperative relation with the interior of said plows, exhaust conductors communicating with the back upper portion of said plow members provided with downwardly directed exit portions at the back side of said plow member, means for conducting fertilizer to said plow members in regulated quantities, and means for conducting fuel to said burners in regulated quantities.

12. In a combination plow, fertilizer and fumigating apparatus, a plurality of combined plow and cutter members arranged in V-shaped alignment and so that their paths are in overlapped relation to each other, said plow members and cutters being hollow, means for conducting fertilizer under pressure to said plows through said cutter members, said plow members consisting of substantially rectangular shaped tapering hollow plate members open at their lower sides, burners in cooperative relation with the interior of said plows, exhaust conductors communicating with the back upper portion of said plow members provided with downwardly directed exit portions at the back side of said plow member, means for conducting fertilizer to said plow members in regulated quantities, means for conducting fuel to said burners in regulated quantities, and means for supporting said plows in certain relation with the upper surface of the ground.

13. In a plow of the class described, the combination of a plurality of hollow tapered substantially rectangularly shaped plow members open over the whole area at their lower sides, positioned in staggered relation to each other and so arranged that their paths overlap each other at their edges when in operation and burners in cooperative relation with the interior of said plow members.

14. In a plow of the class described, the combination of a plurality of hollow tapered substantially rectangularly shaped plow members open over the whole area at their lower sides, positioned in staggered relation to each other and so arranged that their paths overlap each other at their edges when in operation, burners in cooperative relation with the interior of said plow members, and cutter members secured adjacent the front end of said plow members and extending upwardly at their center in which said burners are mounted.

GEORGE H. WOODS.
WILLIAM F. McCOLLOUGH.